(12) United States Patent
Vincon et al.

(10) Patent No.: US 11,691,712 B2
(45) Date of Patent: Jul. 4, 2023

(54) WINDOW UNIT FOR AN AIRCRAFT, AIRCRAFT HAVING THE WINDOW UNIT, AND METHOD FOR ASSEMBLING THE WINDOW UNIT

(71) Applicant: Diehl Aviation Laupheim GmbH, Laupheim (DE)

(72) Inventors: Markus Vincon, Bad Wurzach (DE); Sandra Kimmig, Neu-Ulm (DE)

(73) Assignee: Diehl Aviation Laupheim GmbH, Laupheim (DE)

( * ) Notice: Subject to any disclaimer, the term of this patent is extended or adjusted under 35 U.S.C. 154(b) by 188 days.

(21) Appl. No.: 17/142,494

(22) Filed: Jan. 6, 2021

(65) Prior Publication Data

US 2021/0221492 A1 Jul. 22, 2021

(30) Foreign Application Priority Data

Jan. 22, 2020 (DE) .......................... 102020000356.7

(51) Int. Cl.
*B64C 1/14* (2006.01)

(52) U.S. Cl.
CPC .................................. *B64C 1/1484* (2013.01)

(58) Field of Classification Search
CPC .... B64C 1/1484; B64C 1/1476; B64C 1/1492
See application file for complete search history.

(56) References Cited

U.S. PATENT DOCUMENTS

| 6,227,491 B1 | 5/2001 | Stephan et al. |
| 8,297,556 B2 | 10/2012 | Krahn |
| 2016/0362168 A1* | 12/2016 | Busscher .............. B64C 1/1484 |

FOREIGN PATENT DOCUMENTS

| AT | 404925 B | 3/1999 |
| DE | 102005058749 A1 | 2/2007 |

* cited by examiner

*Primary Examiner* — Timothy D Collins
*Assistant Examiner* — Eric Acosta
(74) *Attorney, Agent, or Firm* — Laurence A. Greenberg; Werner H. Stemer; Ralph E. Locher (57) ABSTRACT

A window unit for an aircraft includes a wall module having a side wall laterally delimiting an aircraft cabin. The side wall has a window opening and the wall module has retaining portions. A window module has a window frame accommodating at least one windowpane and the window module has fastening portions. A fastening configuration fastens the window module on the side wall in a region of the window opening. The fastening configuration is formed by a respective fastening portion engaging with a respective retaining portion. The retaining portions and the fastening portions are movable into a plug-in position by a plug-in movement of the window module and are movable from the plug-in position into a securing position by a rotary movement of the window module. The wall module and the window module are interconnected by a form-locking connection in the securing position.

16 Claims, 5 Drawing Sheets

WINDOW UNIT FOR AN AIRCRAFT, AIRCRAFT HAVING THE WINDOW UNIT, AND METHOD FOR ASSEMBLING THE WINDOW UNIT

CROSS-REFERENCE TO RELATED APPLICATION

This application claims the priority, under 35 U.S.C. § 119, of German Patent Application DE 10 2020 000 356, filed Jan. 22, 2020; the prior application is herewith incorporated by reference in its entirety.

BACKGROUND OF THE INVENTION

Field of the Invention

The invention relates to a window unit for an aircraft having a wall module with a side wall for laterally delimiting an aircraft cabin, the side wall having at least one window opening, a window module having a window frame for accommodating at least one windowpane, a fastening configuration for fastening the window module on the side wall in the region of the window opening, the wall module having a plurality of retaining portions, the window module having a plurality of fastening portions and a respective fastening portion engaging with a respective retaining portion for the purpose of forming the fastening configuration. The invention also relates to an aircraft having the window unit and to a method for assembling the window unit.

Interchangeable window subassemblies which are intended for aircraft cabins and can be connected to a side-wall panel in a releasable manner through fastening devices are known. Different fastening concepts are known for releasable fastening purposes, wherein, in one possible fastening concept, for example clip nuts are mounted on holders integrated in the side-wall panel. The window subassembly is then positioned on the holders and screwed firmly to the holders at a number of locations through screws which can be screwed into the clip nuts. In the case of an alternative fastening concept, the window subassembly can be clipped into appropriate holders of the side-wall panel through a plurality of hooks.

U.S. Patent Application Publication No. 2016/0362168 A1 discloses an aircraft window having an outer window configuration, in which the outer window configuration has a pressure pane which is connected to a pressure-pane frame. An inner window configuration has a bezel, which is configured to couple a circumference of the inner window configuration against the outer window configuration, and the bezel has a multiplicity of fastening devices. A multiplicity of retaining devices are disposed around the outer window configuration, and the fastening devices and the retaining devices each contain hooks which can be brought into engagement with one another in order for the inner window configuration to be retained on the outer window configuration.

Further window units for an aircraft are known from German Patent Application DE 10 2005 058 749 A1, corresponding to U.S. Pat. No. 8,297,556 and from Austrian Patent AT 404 925 B, corresponding to U.S. Pat. No. 6,227,491.

BRIEF SUMMARY OF THE INVENTION

It is accordingly an object of the invention to provide a window unit for an aircraft, an aircraft having the window unit and a method for assembling the window unit, which overcome the hereinafore-mentioned disadvantages of the heretofore-known window units, aircrafts and methods of this general type and which are distinguished by simplified and reliable assembly.

This object is achieved by a window unit and an aircraft having the features described below and by a method having the steps described below. Preferred or advantageous embodiments of the invention can be gathered from the dependent claims, from the following description and from the accompanying figures.

With the foregoing and other objects in view there is provided, in accordance with the invention, a window unit which is configured and/or suitable for an aircraft. The aircraft cabin can be preferably a passenger cabin of the aircraft.

The window unit has a wall module, and the wall module has a side wall which is configured and/or suitable for laterally delimiting the aircraft cabin. In particular, the side wall is configured in the form of an inner-cladding component which serves to clad the aircraft cabin. For example, the side wall can be configured in the form of a wall panel. The side wall has one or more, preferably at least or precisely two, window openings. In particular, the window opening serves to form a side window, in particular a cabin window, of the aircraft.

The window unit also has a window module. In particular the window module is connected in an interchangeable and/or releasable manner to the wall module. The window module is preferably disposed on a side of the side wall which is directed away from the aircraft cabin. Specifically, in an installed situation, the window module is disposed between an inner and an outer side wall of the aircraft. The window module is and/or can be disposed on the side wall in the region of the window opening. The window module is preferably disposed on the side wall in a congruent manner in relation to the window opening. The window unit is preferably constructed in modular fashion from the wall module and the window module and, in an assembled state, the wall module and the window module have been joined to one another to form a structurally interconnected unit.

The window module has a window frame, which is configured and/or suitable for accommodating at least one, or precisely one, windowpane. In particular, the window frame serves for framing the window opening and, in an assembled state, the windowpane is accommodated in the window frame in such a way that it covers over the window opening. As an optional extra, the window module can have a light-reducing device, which is configured and/or suitable for providing shade for the windowpane. For example, the light-reducing device can be configured in the form of a screen or a blind or the like, which is disposed between the window frame and the windowpane.

The window unit has a fastening configuration, which is configured and/or suitable for fastening the window module, in particular in a releasable manner, on the side wall. The fastening configuration in this case includes a plurality of fastening portions, which are disposed on the window module, and a plurality of retaining portions, which are disposed on the wall module, so that a respective fastening portion engages with a respective retaining portion. The window module preferably has more than two, preferably more than four, specifically more than six, of the fastening portions. The wall module preferably has more than two, preferably more than four, specifically more than six, of the fastening portions. The wall module particularly preferably has as many retaining portions as the window module has fastening portions.

Within the context of the invention, it is proposed that the fastening portions and the retaining portions can be moved into a plug-in position through a plug-in movement of the window module. The retaining portions and the fastening portions are preferably plugged one inside the other during the plug-in movement. In particular, the window module and the wall module are moved in relative terms towards one another during the plug-in movement in a plug-in direction. In particular, in an installed situation of the window unit, the plug-in direction defined by the plug-in movement is directed transversely in relation to a longitudinal axis of the aircraft (x axis). The fastening portions and the retaining portions can be moved from the plug-in position into a securing position through a rotary movement of the window module, the rotary movement in particular following the plug-in movement. The fastening portions and the retaining portions are preferably moved, or rotated, relative to one another during the rotary movement. In particular, the window module and the wall module are rotated relative to one another during the rotary movement in a direction of rotation. In particular, in an installed situation of the window unit, the direction of rotation defined by the rotary movement is directed about a transverse axis of the aircraft (y axis). The window module is or can therefore preferably be connected to the wall module through a plug-in/rotary connection. In the securing position, the window module is retained on the side wall through a form-locking connection. In particular, the fastening portions and the retaining portions, in the securing position, are connected to one another in a form-locking manner at least in the plug-in direction. The fastening portions and the retaining portions, in the securing position, are particularly preferably connected to one another in a form-locking manner in an axial direction in relation to the transverse axis of the aircraft (y axis) and/or the longitudinal axis of the aircraft (x axis) and/or a vertical axis of the aircraft (z axis).

The advantage of the invention is that particularly straightforward and rapid assembly of the window unit is realized as a result of the plug-in/rotary connection. It is thus possible for the window unit to be quickly and straightforwardly, and therefore cost-effectively, put together and, if appropriate, taken apart again, for example for maintenance work. A further advantage of the plug-in/rotary connection is that load cases which occur, such as, for example, flying, landing and emergency-landing forces and actuating forces when the light-reducing device is being opened and closed, do not occur in the assembly direction, in particular the direction of rotation, as a result of which it is possible to realize low-level assembly and removal forces and assembly can be further simplified. In addition, it is possible to ensure a reliable connection between the window unit and the wall unit.

In a specific configuration, provision is made for the fastening portions and the retaining portions to be connected to one another through a keyhole connection. For this purpose, basically the one portion, that is to say optionally the fastening portions or the retaining portions, can have a keyhole opening, and the other portion has a fastening bolt, which can be plugged into the keyhole opening and can be moved in the keyhole opening. The keyhole connection is established preferably by a relative movement of the fastening bolt within the keyhole opening from the plug-in position into the securing position. It should be pointed out that, rather than the keyhole opening being restricted to the shape of a keyhole, it is to be understood in general terms to mean a keyhole-like opening or depression. The keyhole connection is used to propose a connection between the window module and the wall module which can be straightforwardly established and released again. In addition, the keyhole connection can result in the two modules being assembled without any screwing devices being required, and therefore loose constituent parts are avoided.

Provision is particularly preferably made for the retaining portions each to have the keyhole opening, and the fastening portions each to have the fastening bolt, for forming the keyhole connection. The keyhole opening can basically be made directly in the side wall, in order to form the retaining portion. However, the keyhole opening is preferably made in a holder, which is disposed or fastened in particular on the side wall. The holder can be connected in a form-locking and/or force-locking and/or integral manner to the side wall. The fastening bolts can basically be configured in the form of separate bolts, e.g. threaded bolts or the like which can be screwed in and unscrewed. However, the fastening bolts are particularly preferably formed directly on the window module, in particular the window frame, and/or fixed to the window module, in particular the window frame. In the plug-in position, the fastening bolts are plugged in the associated keyhole opening in each case and, in the securing position, the fastening bolts are plugged in the associated keyhole opening in each case and additionally engage behind the associated retaining portion.

In a further specific embodiment, provision is made for the keyhole openings each to have a relatively small and a relatively large opening diameter, wherein the relatively small opening diameter adjoins the relatively large opening diameter in the direction of rotation. All of the keyhole openings are preferably disposed one behind the other and/or oriented in the same way in the direction of rotation. In the plug-in position, the associated fastening bolt is plugged in the relatively large opening diameter. The relatively large opening diameter in this case is dimensioned in such a way that the fastening bolt can be plugged into the keyhole opening without obstruction in the plug-in direction. In the securing position, the associated fastening bolt is disposed in the smaller opening diameter. The smaller opening diameter in this case is dimensioned in such a way that the fastening bolt is retained in a self-locking manner and/or is prevented from being pulled out and/or is supported on the retaining portion at least counter to the plug-in direction.

Provision is preferably made for the fastening bolts each to have an end-side fastening collar. In particular, the fastening collar is configured in the form of a radially outwardly directed flange-like widening. The fastening collar preferably has a diameter which is smaller than or equal to the relatively large opening diameter and, at the same time, is larger than the relatively small opening diameter. In the securing position, the fastening collar therefore engages behind the retaining portion, this resulting in the formation of a form-locking connection counter to the plug-in direction.

In a further configuration, provision is made for the window module and the wall module, in the securing position, to be secured against rotation through a snap-fit connection. The snap-fit connection has the function of securing the window module and the side-wall module, in the securing position, against undesired release. In particular, during rotation from the plug-in position into the securing position, the window module latches automatically with the wall module, this resulting in a form-locking connection in or counter to the direction of rotation. The snap-fit connection is therefore used to propose a fastening configuration which withstands all possible load cases, such as, for example, flying and landing forces. In addition, the snap-fit connection results in the window module being mounted and/or secured without any tools being required.

In a further specific embodiment, provision is made for at least one, or precisely one, of the fastening portions to have a snap-fit hook. In particular, one fastening portion has, or some or all of the fastening portions each have, a snap-fit hook. The snap-fit hook is preferably disposed adjacently to the fastening bolt and/or in front of or behind the fastening bolt, as seen in the direction of rotation. The associated retaining portion has a snap-fit-hook mount, which is configured and/or suitable in particular for receiving the snap-fit hook. A respective snap-fit-hook mount is preferably provided for each snap-fit hook. The snap-fit-hook mount is preferably disposed adjacently to the keyhole opening and/or in front of or behind the keyhole opening, as seen in the direction of rotation. In the securing position, the snap-fit hook engages with the snap-fit-hook mount to form the snap-fit-hook connection. In particular, the snap-fit hook is elastically deformable in the plug-in direction so that, during the plug-in movement and/or the rotary movement, the snap-fit hook deforms elastically and then, when the securing position is reached, it hooks into the snap-fit-hook mount. A fastening configuration which is distinguished by high-level reliability of assembly is therefore proposed. In addition, the action of the snap-fit hook snapping into the snap-fit-hook mount gives rises to haptically and/or acoustically perceptible feedback when the securing position has been reached.

In one implementation, provision is made for the snap-fit hook to engage in the snap-fit-hook mount from above in the plug-in direction. In particular, the snap-fit-hook mount can be configured in the form of a through-passage, bore, depression, recess, aperture, or the like, which is made in the plug-in direction. The snap-fit hook has, in particular, a snap-fit nose which is oriented in the plug-in direction and, in the securing position, is accommodated in an accurately fitting and/or play-free manner in the snap-fit-hook mount. By being raised counter to the plug-in direction, the snap-fit hook can be released and/or the snap-fit nose can be released from the snap-fit-hook mount, and therefore the window module can be rotated relative to the wall module, for example for removal purposes.

In an alternative implementation, provision is made for the snap-fit hook to engage in the snap-fit-hook mount from beneath counter to the plug-in direction. In particular, the snap-fit-hook mount can be configured in the form of a through-passage, bore, depression, recess, aperture, or the like, which is made counter to the plug-in direction. The snap-fit hook has, in particular, a snap-fit nose which is oriented counter to the plug-in direction and, in the securing position, is accommodated in an accurately fitting and/or play-free manner in the snap-fit-hook mount. The snap-fit hook, in the securing position, is particularly preferably disposed between the side wall and the retaining portion, in particular in an intermediate gap beneath the retaining portion. By being pushed-in in the plug-in direction, the snap-fit hook can be released and/or the snap-fit nose can be released from the snap-fit-hook mount, and therefore the window module can be rotated relative to the wall module, for example for removal purposes.

In one structural implementation, provision is made for the fastening portions and the window frame to be manufactured from a common material portion. As an alternative, or as an optional extra, the fastening portions are formed directly on the window frame. In particular, the window frame and the fastening portions are manufactured in one piece, in particular from a common plastic injection molding. As an alternative, however, it is also possible for the fastening portions to be molded onto the window frame. A window module which is particularly straightforward and cost-effective to manufacture is therefore proposed. A screw-free and/or reduced-component fastening configuration is proposed in addition.

In a further embodiment, provision is made for the fastening portions to be disposed on the window frame in an at least laterally distributed manner and for the retaining portions to be disposed on the side wall in such a way that they are distributed at least laterally in relation to the window opening. In particular, the fastening portions are disposed uniformly and/or at a distance apart from one another around the window frame and the retaining portions are disposed uniformly and/or at a distance apart from one another around the window opening. In each case two retaining portions and fastening portions, in particular located opposite one another, are particularly preferably disposed on either side of the window opening. The retaining portions and the fastening portions can be disposed in accordance with the Poka-Yoke principle, and therefore the retaining portions and the fastening portions can be brought into engagement with one another in just a single orientation of the window module. For example, the retaining portions and the fastening portions can be disposed around the window opening in an asymmetrically and/or irregularly distributed manner. This can rule out incorrect assembly and ensure correctly positioned installation.

With the objects of the invention in view, there is also provided an aircraft having the window unit according to the invention or as already described above. The aircraft is preferably a passenger aircraft.

With the objects of the invention in view, there is furthermore provided a method for assembling the window unit according to the invention or as already described above. The method comprises the following steps:

the wall module is provided;

fastening portions are moved into a plug-in position in relation to the retaining portions through a plug-in movement of the window module; and fastening portions are moved from the plug-in position into a securing position in relation to the retaining portions through a rotary movement of the window module, this resulting in the formation of a form-locking connection between the window module and the wall module.

In order to mount the window module, the window frame is positioned on the window opening. The fastening bolts in this case are preferably plugged into the respectively associated keyhole opening, in particular the relatively large opening diameter, through the plug-in movement. During the rotary movement, the fastening bolts are displaced in the direction of rotation within the keyhole opening from the relatively large opening diameter into the relatively small opening diameter, and therefore the fastening bolt engages behind the retaining portion by way of its fastening collar.

In order to remove the window module, in a further method step, the window module can be moved from the securing position into the plug-in position through a rotary counter-movement. In particular, the fastening bolts in this case are displaced counter to the direction of rotation within the keyhole opening from the relatively small opening diameter into the relatively large opening diameter. The window module can then be removed counter to the plug-in direction.

In a further method step, provision is made for the at least one snap-fit hook to snap automatically into the snap-fit-hook mount during the rotary movement of the window frame from the plug-in position into the securing position. In particular, the snap-fit hook is deformed elastically during the plug-in movement and/or during the rotary movement and then hooks in the associated snap-fit-hook mount when the securing position is reached. For removal purposes, the snap-fit hook, depending on the configuration, is deformed in or counter to the plug-in direction, e.g. by hand or using a tool, as a result of which the snap-fit hook is released from the snap-fit-hook mount and the window module is therefore freed to rotate.

Other features which are considered as characteristic for the invention are set forth in the appended claims.

Although the invention is illustrated and described herein as embodied in a window unit for an aircraft, an aircraft having the window unit and a method for assembling the window unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
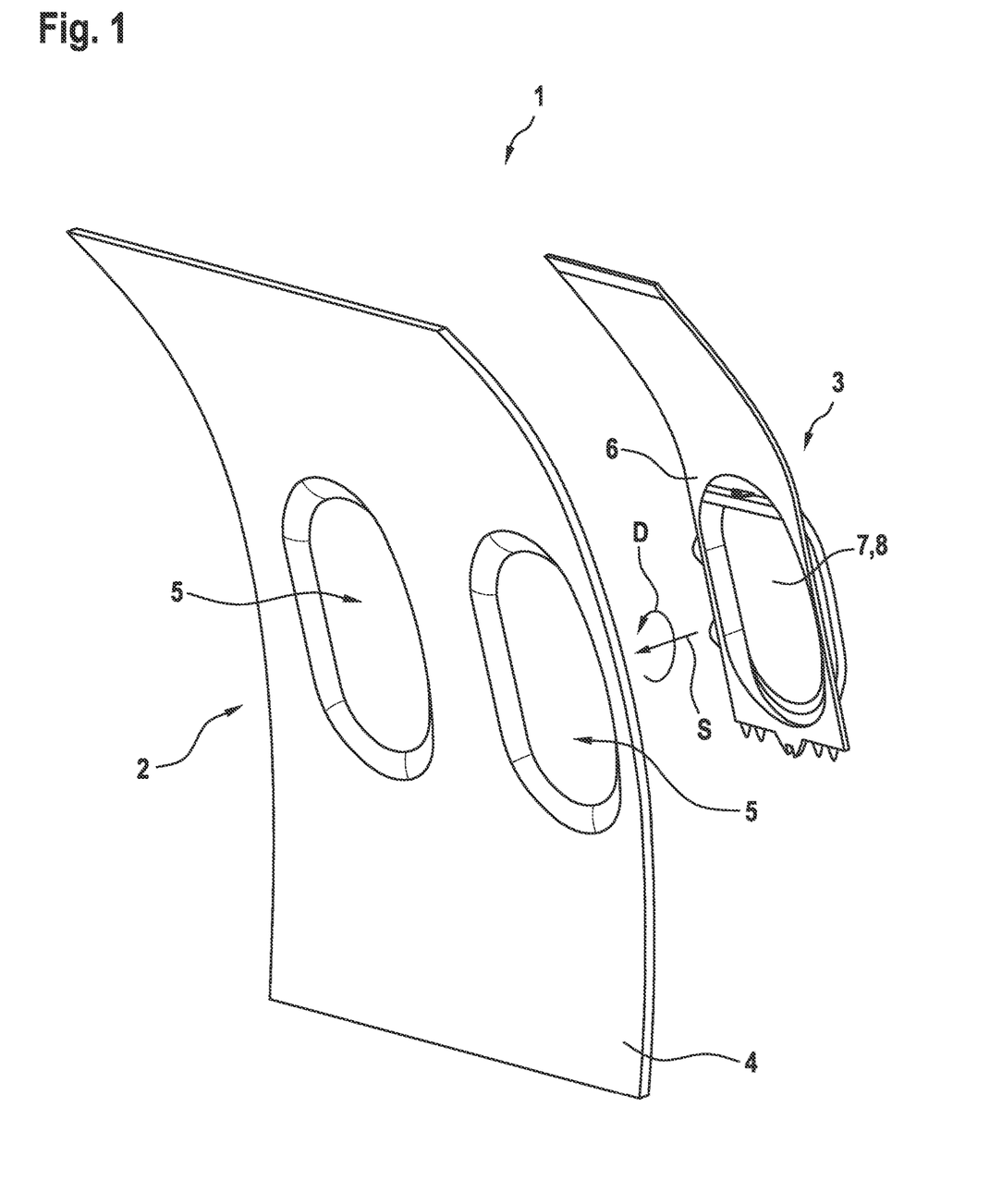
FIG. 1 is a diagrammatic, exploded, perspective view of a window unit for an aircraft.

Referring now to the figures of the drawings in detail and first, particularly, to FIG. 1 thereof, there is seen an exploded perspective illustration of a window unit 1 for an aircraft as one exemplary embodiment of the invention. The window unit 1 has a wall module 2 and a window module 3 and, in an assembled state, the window module 3 is fastened on the wall module 2. The wall module 2 includes a side wall 4, which serves to clad an aircraft interior, for example a passenger cabin. The side wall 4 in this case is configured in the form of a cladding panel.

In the exemplary embodiment shown, the side wall 4 has two window openings 5 and the window module 3, in the assembled state, is positioned on one of the two window openings 5 on a side of the side wall 4 which is directed away from the aircraft interior. A separate window module 3 is preferably provided for each window opening 5. The window module 3 has a window frame 6, which frames the window opening 5. In particular, a light-reducing device 8 and/or a windowpane 7, which covers over the window opening 5, is and/or can be inserted into the window frame 6. The light-reducing device 8 can be configured, for example, in the form of a mechanically and/or electrically actuable sun blind.

The window module 3 is configured in the form of an interchangeable window module. For this purpose, the window module 3 can be mounted in a releasable manner on the side wall 4 through a plug-in movement directed in a plug-in direction S and a subsequent rotary movement directed in a direction of rotation D. The window module 3 can therefore be connected to the wall module 2 through a plug-in/rotary connection.

Figure 2A:
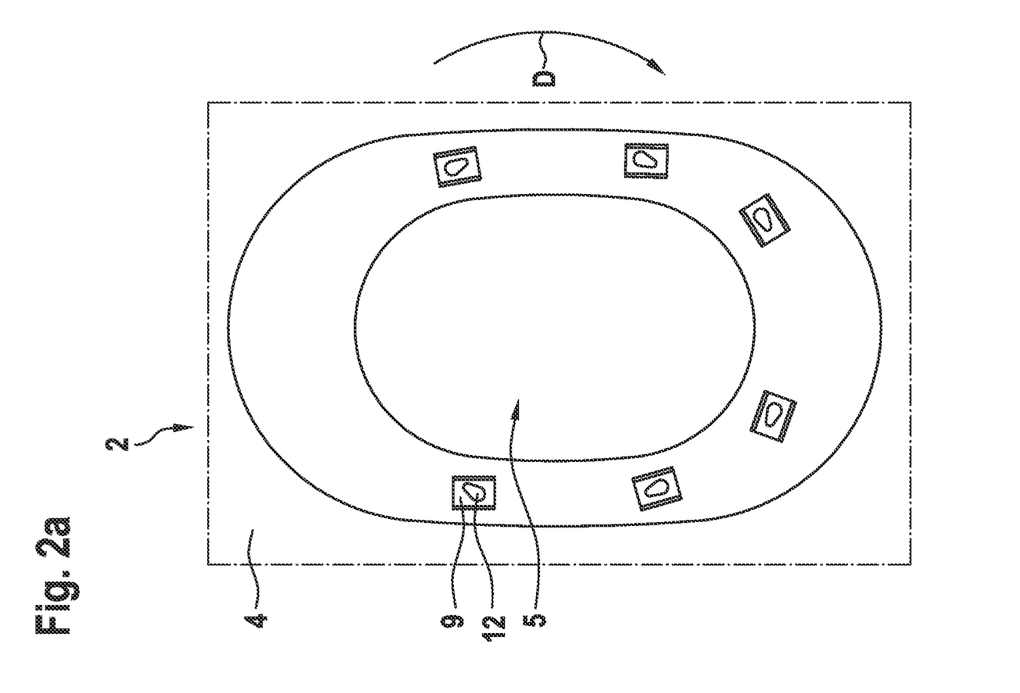
FIGS. 2A and 2B are elevational views each showing a portion of the window unit of FIG. 1 in different states of assembly.

FIG. 2A shows a detail of the wall module 2 as seen in the plug-in direction S. The wall module 2 in this case has a plurality of, in particular precisely six, retaining portions 9, which are disposed in the form of a U around the window opening 5. The retaining portions 9 are configured in the form of individual holders which are fixed on the side wall 4 for example through an adhesive-bonding connection.

Figure 2B:
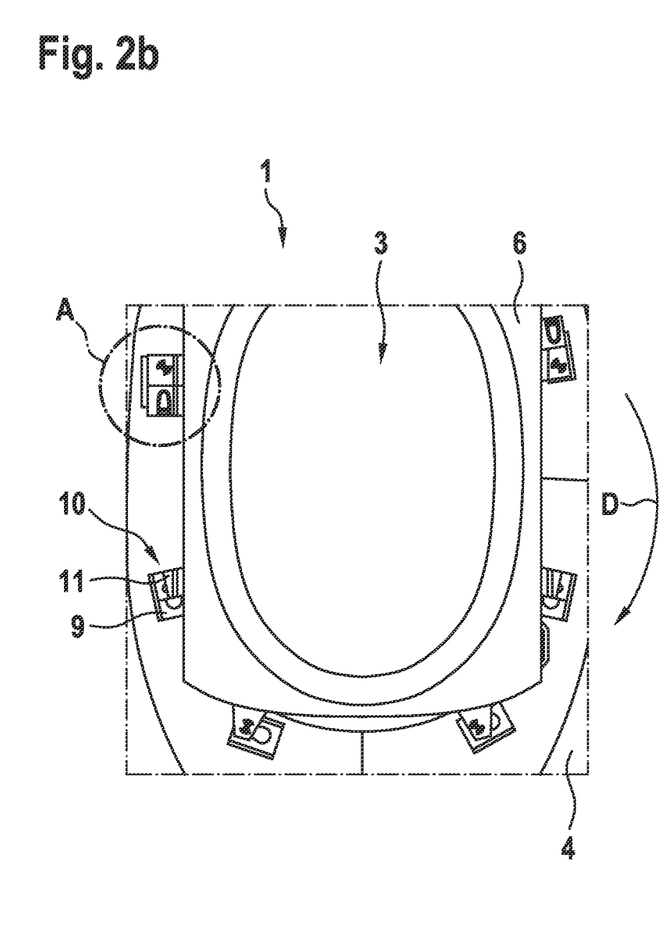

FIG. 2B shows, in the same kind of illustration as FIG. 2A, the window unit 1 including the window module 3 in an assembled state, wherein the window module 3 is mounted on the side wall 4 through a fastening configuration 10. For this purpose, the window module 3 has a plurality of fastening portions 11. A respective fastening portion 11 engages with one of the retaining portions 9 for forming the fastening configuration 10 and/or the plug-in/rotary connection. The fastening portions 11 are formed directly on the window frame 6. The window frame 6 and the fastening portions 11 can be manufactured from a common plastic injection molding.

The retaining portions 9 each have a keyhole opening 12, as illustrated in FIG. 2A. The keyhole openings 12 in this case are oriented in the same way in the direction of rotation D, so that an opening diameter of the keyhole opening 12 decreases in the direction of rotation D. The fastening portions 11 and the retaining portions 9 can be moved into a plug-in position through the plug-in movement of the window module 3 in the plug-in direction S. For this purpose, the fastening portions 11 are plugged into the respectively associated keyhole opening 12 in the plug-in direction S. The fastening portions 11 and the retaining portions 9 can then be moved into a securing position through the rotary movement of the window module 3 in the direction of rotation D. For this purpose, the fastening portions 11 are displaced in the direction of rotation D within the keyhole opening 12. In the securing position, the fastening portions 11 engage behind the retaining portions 9, resulting in the formation of a form-locking connection and resulting in the window module 3 being secured on the wall module 2.

Figure 3A:
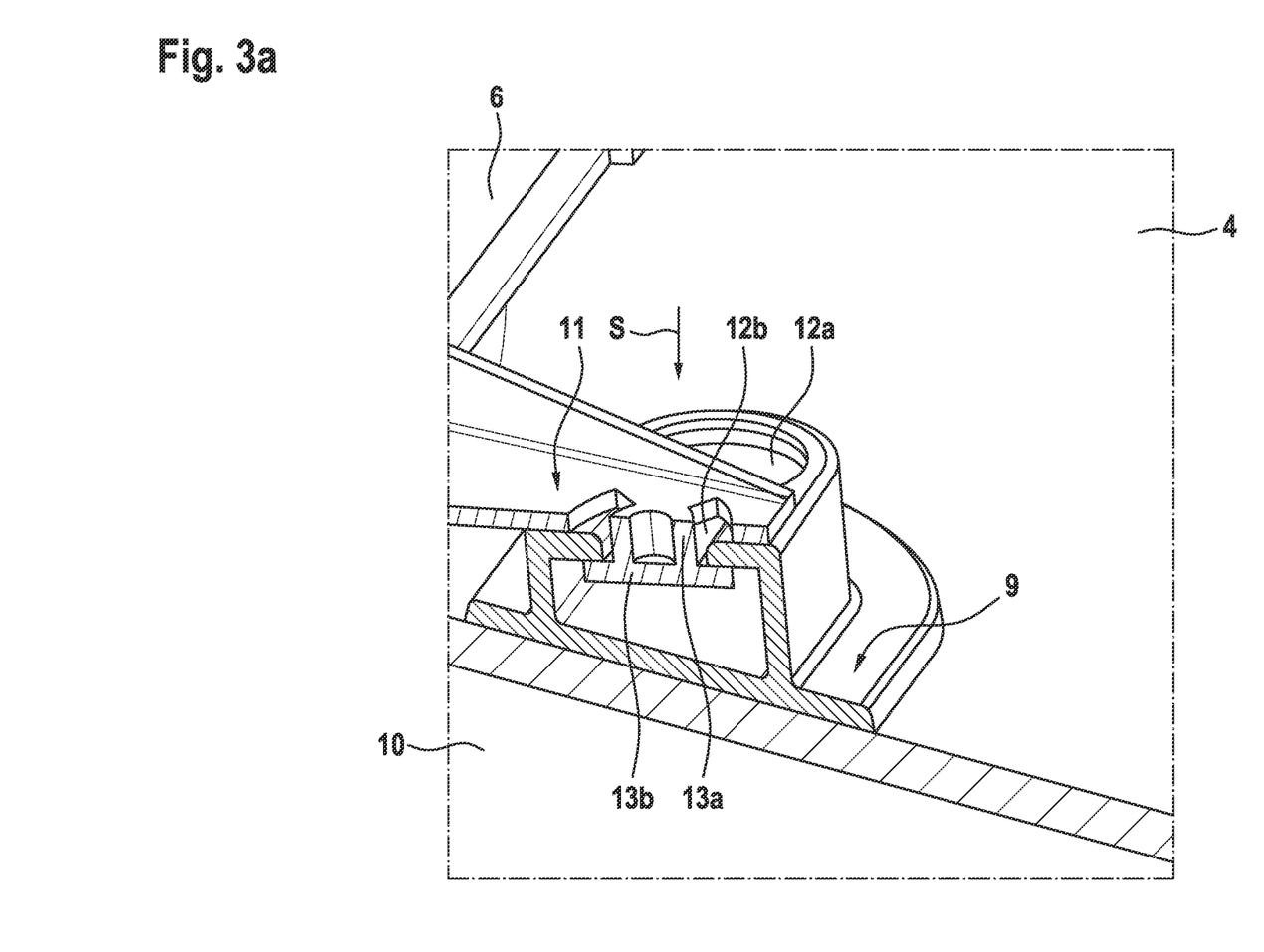
FIGS. 3A, 3B and 3C are fragmentary views each showing a fastening configuration of the window unit of FIG. 1.
Figure 3B:
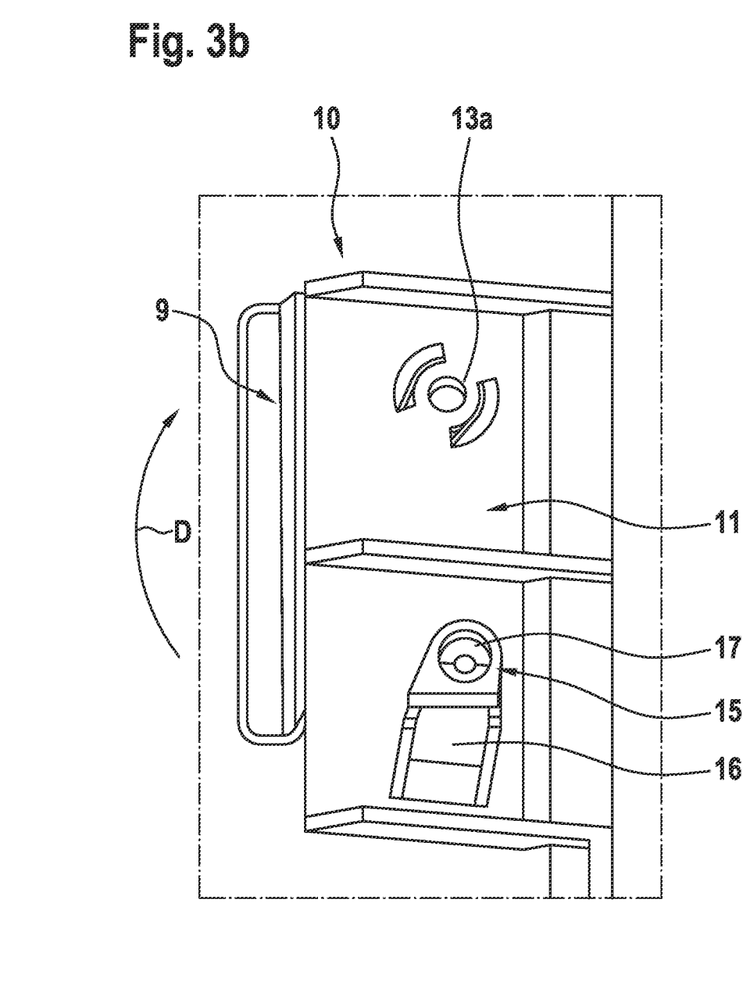

FIGS. 3A and 3B each show different views of a detail A, as indicated in FIG. 2B, of the fastening configuration 10 as a further exemplary embodiment of the invention.

FIG. 3A shows a sectional illustration through the fastening configuration 10, wherein the retaining portions 9 and the fastening portions 11 are disposed in the securing position. The fastening portions 11 each have a fastening bolt 13a, which extends into the keyhole opening 12 in the plug-in direction S. The fastening bolts 13a each have an end-side fastening collar 13b, so that in the securing position, the fastening collar 13b engages behind the retaining portion 9 and is supported on the retaining portion 9 counter to the plug-in direction S.

The keyhole opening 12 has a relatively large opening diameter 12a and an adjoining, relatively small opening diameter 12b. The relatively small opening diameter 12b adjoins the relatively large opening diameter 12a in the direction of rotation D. In order to form a keyhole connection 14, the window module 3 is moved in the plug-in direction S and therefore the fastening portions 11 are plugged, by way of their fastening bolts 13a, into the keyhole opening 12 through the relatively large opening diameter 12a, in order for the fastening portions 11 to be moved into the plug-in position in relation to the respectively associated retaining portions 9. The relatively large opening diameter 12a in this case is dimensioned in such a way that the fastening bolt 13a can be plugged, by way of its fastening collar 13b, into the keyhole opening 12 without obstruction. The window module 3 is then rotated in the direction of rotation D and therefore the fastening portions 11 are displaced within the keyhole opening 12, by way of their fastening bolts 13a, from the relatively large opening diameter 12a into the relatively small opening diameter 12b, in order for the fastening portion 11 and the associated retaining portion 9 to be moved into the securing position. The relatively small opening diameter 12b in this case is dimensioned in such a way that the fastening bolt 13a forms a form-locking connection with the retaining portion 9 by way of its fastening collar 13b.

FIG. 3B shows a plan view in the plug-in direction S of the fastening configuration 10 as indicated in the detail A. The fastening configuration 10 has a snap-fit connection 15, which secures the window module 3 against rotation in and counter to the direction of rotation D when the fastening portions 11 are in the securing position in relation to the retaining portions 9. For this purpose, the snap-fit connection 15 has a snap-fit hook 16, which is disposed on at least one of the fastening portions 11, and a snap-fit-hook mount 17, which is provided in at least one of the retaining portions 9. The snap-fit hook 16, in the securing position, is accommodated in the snap-fit-hook mount 17, in order to form the snap-fit connection 15.

The snap-fit hook 16 and the snap-fit-hook mount 17 are disposed in front of the fastening bolt 13a and/or of the keyhole opening 12, as seen in the direction of rotation D. During the rotary movement from the plug-in position into the securing position, the snap-fit hook 16 latches automatically into the snap-fit-hook mount 17, and therefore the window module 3 is connected to the wall unit 4 in a form-locking manner in the direction of rotation D.

Figure 3C:
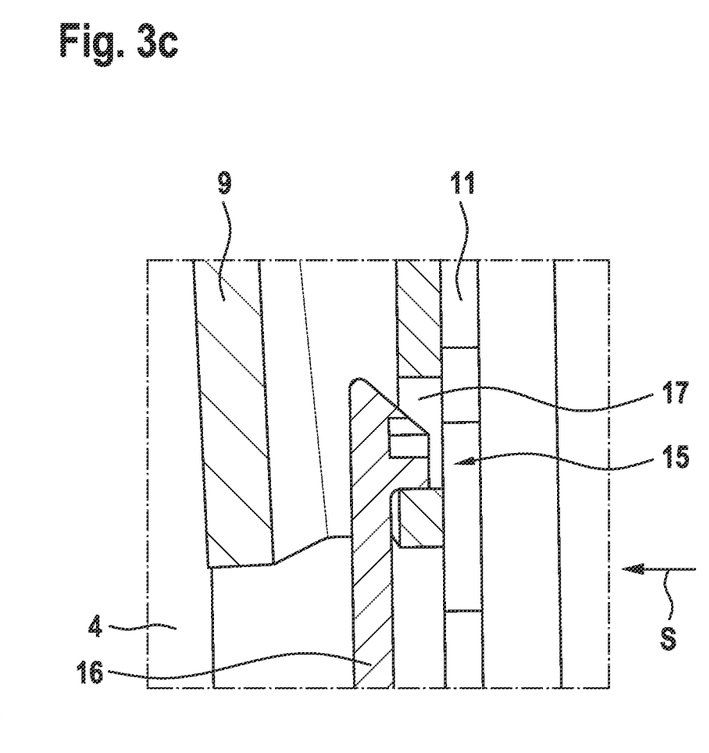

FIG. 3C shows a sectional illustration through the snap-fit connection 15 of FIG. 3B. The snap-fit hook 16 in this case engages in the snap-fit-hook mount 17 from beneath, so that the snap-fit hook 16 is supported on the retaining portion 9 counter to the plug-in direction S. For release of the snap-fit connection 15, the snap-fit hook 16 can be pushed-in in the plug-in direction S, and therefore the snap-fit hook 16 is moved out of the snap-fit-hook mount 17. This allows the window module 3 to be rotated counter to the direction of rotation D, and the fastening portions 11 and the retaining portions 9 to be transferred from the securing position into the plug-in position, in order for the window module 3 to be removed counter to the plug-in direction S.

The above-described plug-in/rotary connection is used to propose a fastening configuration 10 which is distinguished by reduced-component and tool-free mounting of the window module 3 on the side wall 4. Doing away with additional connecting and fastening elements makes it possible to realize particularly rapid and cost-effective assembly of the window unit 1. Due to the combined plug-in/rotary movement, in addition, the assembly method proposed is one which is distinguished by low-level assembly and dismantling forces (only the snap-in and release force of the snap-fit hooks 16). In addition, the rotary movement generates a form-locking connection which can absorb most of the loading which occurs, such as, for example, flying, landing and emergency-landing forces and/or forces which can occur when the light-reducing device 8 is being opened and closed. In other words, these forces do not occur in the assembly direction, that is to say the direction of rotation D.

Figure 4A:
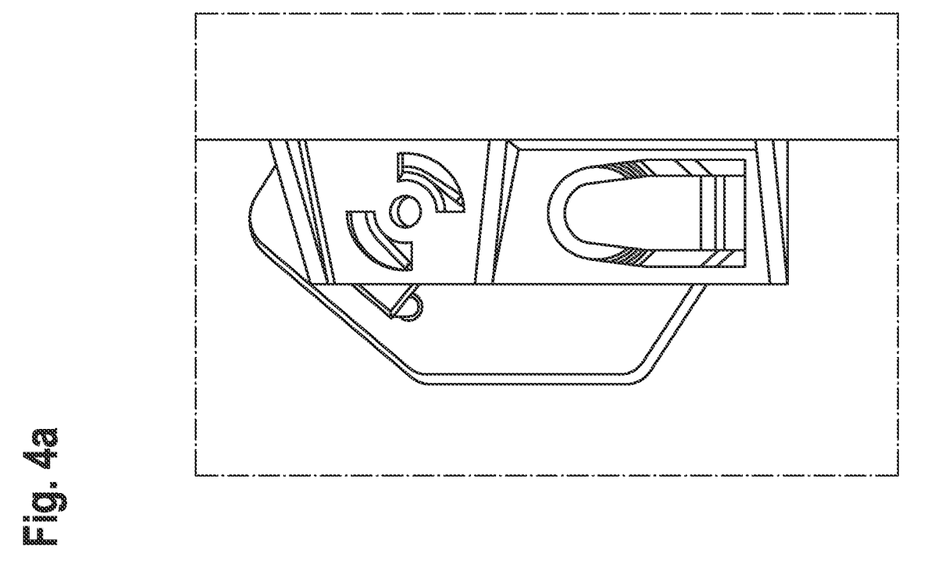
FIGS. 4A and 4B are fragmentary views each showing an illustration similar to that of FIGS. 3B and 3C of an alternative embodiment of the fastening configuration.
Figure 4B:
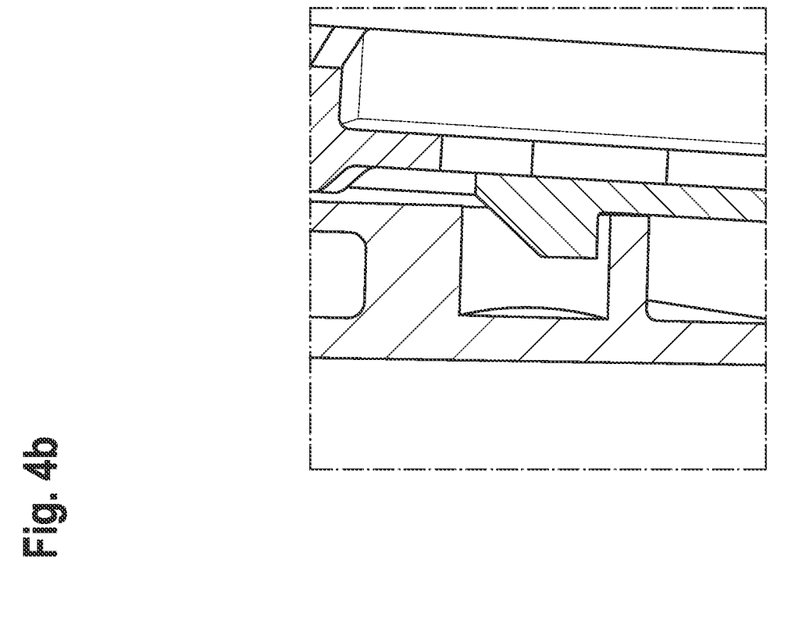

FIGS. 4A and 4B show, in an illustration similar to that of FIGS. 3B and 3C, an alternative embodiment of the fastening configuration 10 and/or of the snap-fit connection 15. The snap-fit hook 16 in this case engages in the snap-fit-hook mount 17 from above, so that the snap-fit hook 16 is supported on the retaining portion 9 in the plug-in direction S. For release of the snap-fit connection 15, the snap-fit hook 16 can be raised counter to the plug-in direction S, and therefore the snap-fit hook 16 is moved out of the snap-fit-hook mount 17. As already described, the window module 3 can then be rotated counter to the direction of rotation D and removed counter to the plug-in direction S.

The following is a summary list of reference numerals and the corresponding structure used in the above description of the invention:
1 Window unit
2 Wall module
3 Window module
4 Side wall
5 Window opening
6 Window frame
7 Windowpane
8 Light-reducing device
9 Retaining portion
10 Fastening configuration
11 Fastening portion
12 Keyhole opening
12a Relatively large opening diameters
12b Relatively small opening diameters
13a Fastening bolt
13b Fastening collar
14 Keyhole connection
15 Snap-fit connection
16 Snap-fit hook
17 Snap-fit-hook mount
A Detail
D Direction of rotation
S Plug-in direction

The invention claimed is:
1. A window unit for an aircraft, the window unit comprising:
   a wall module having a side wall for laterally delimiting an aircraft cabin, said side wall having at least one window opening, said wall module having a plurality of retaining portions;
   a window module having a window frame for accommodating at least one windowpane, said window module having a plurality of fastening portions;
   a fastening configuration for fastening said window module on said side wall in a region of said at least one window opening, said fastening configuration being formed by a respective fastening portion engaging with a respective retaining portion;
   said retaining portions and said fastening portions being movable into a plug-in position by a plug-in movement of said window module and being movable from said plug-in position into a securing position by a rotary movement of said window module; and said wall module and said window module being connected to one another by a form-locking connection in said securing position.

2. The window unit according to claim 1, wherein said retaining portions and said fastening portions are connected to one another by a keyhole connection.

3. The window unit according to claim 2, wherein said retaining portions each have a keyhole opening for forming said keyhole connection, and said fastening portions each have a fastening bolt for forming said keyhole connection, said fastening bolts, in said plug-in position, each being plugged into a respective associated keyhole opening and, said fastening bolts, in said securing position, each additionally engaging behind a respective associated retaining portion.

4. The window unit according to claim 3, wherein said keyhole openings each have a smaller and a larger opening diameter, each smaller opening diameter adjoining a respective larger opening diameter in a direction of rotation defined by said rotary movement, said associated fastening bolt, in said plug-in position, being disposed within said larger opening diameter and said associated fastening bolt, in said securing position, being disposed within said smaller opening diameter.

5. The window unit according to claim 3, wherein said fastening bolts each have a n end-side fastening collar supported in a form-locking manner on a respective retaining portion in said securing position.

6. The window unit according to claim 1, wherein said wall module and said window module are secured against rotation by a snap-fit connection in said securing position.

7. The window unit according to claim 6, wherein at least one of said fastening portions has a snap-fit hook and an associated retaining portion has a snap-fit-hook mount, said snap-fit hook engaging with said snap-fit-hook mount to form said snap-fit connection in said securing position.

8. The window unit according to claim 6, wherein said snap-fit hook engages in said snap-fit-hook mount from above in a plug-in direction defined by said plug-in movement, and said snap-fit hook is releasable by being raised counter to said plug-in direction.

9. The window unit according to claim 6, wherein said snap-fit hook engages in said snap-fit-hook mount from below counter to a plug-in direction defined by said plug-in movement, and said snap-fit hook is releasable by being pushed-in in said plug-in direction.

10. The window unit according to claim 1, wherein said fastening portions and said window frame are formed by a common material portion, or said fastening portions are formed directly on said window frame.

11. The window unit according to claim 1, wherein said fastening portions and said window frame are formed by a common material portion, and said fastening portions are formed directly on said window frame.

12. The window unit according to claim 1, wherein said fastening portions are at least laterally distributed on said window frame, and said retaining portions are at least laterally distributed on said side wall relative to said window opening.

13. An aircraft, comprising a window unit according to claim 1.

14. A method for assembling a window unit, the method comprising:

providing the window unit having said wall module with said retaining portions according to claim 1;

moving said fastening portions into said plug-in position relative to said retaining portions by carrying out said plug-in movement of said window module;

moving said fastening portions from said plug-in position into said securing position relative to said retaining portions by carrying out said rotary movement of said window module; and connecting said wall module and said window module to one another by providing said form-locking connection in said securing position.

15. The method according to claim 14, which further comprises removing said window module by moving said window module from said securing position into said plug-in position counter to a direction of rotation defined by said rotary movement and, while in said plug-in position, removing said window module counter to a plug-in direction defined by said plug-in movement.

16. The method according to claim 14, which further comprises:

providing a snap-fit connection including a snap-fit hook of at least one of said fastening portions and a snap-fit-hook mount of an associated retaining portion; and automatically snapping said snap-fit hook into said snap-fit-hook mount by carrying out said rotary movement of said window module from said plug-in position into said securing position to secure said wall module and said window module against rotation in said securing position.

\* \* \* \* \*